(12) United States Patent
Boys (10) Patent No.: US 8,953,340 B2
(45) Date of Patent: Feb. 10, 2015

(54) SINGLE PHASE POWER SUPPLY FOR INDUCTIVELY COUPLED POWER TRANSFER SYSTEMS (75) Inventor: John Talbot Boys, Auckland (NZ)

(73) Assignee: Auckland Uniservices Limited, Auckland (NZ)

( * ) Notice: Subject to any disclaimer, the term of this patent is extended or adjusted under 35 U.S.C. 154(b) by 1399 days.

(21) Appl. No.: 12/224,534

(22) PCT Filed: Feb. 28, 2007

(86) PCT No.: PCT/NZ2007/000041
§ 371 (c)(1),
(2), (4) Date: Dec. 9, 2008

(87) PCT Pub. No.: WO2007/100265
PCT Pub. Date: Sep. 7, 2007

(65) Prior Publication Data
US 2009/0129126 A1    May 21, 2009

(30) Foreign Application Priority Data

Feb. 28, 2006  (NZ) .......................... 545664

(51) Int. Cl.
H02M 3/335    (2006.01)
H02J 5/00     (2006.01)

(52) U.S. Cl.
CPC ..................... H02J 5/005 (2013.01)
USPC .......................... 363/17; 363/131

(58) Field of Classification Search
USPC ......... 363/17–26, 37, 56.02, 97–98, 131–134
See application file for complete search history.

(56) References Cited

U.S. PATENT DOCUMENTS

| 4,659,894 | A | * | 4/1987 | Inoue | 219/69.18 |
| 4,832,133 | A | * | 5/1989 | Boys | 173/1 |
| 4,881,022 | A | * | 11/1989 | Boys | 318/800 |
| 5,126,585 | A | * | 6/1992 | Boys | 307/66 |

(Continued)

FOREIGN PATENT DOCUMENTS

JP    7-227003    8/1995
JP    9028078     1/1997

(Continued)

OTHER PUBLICATIONS

IEEE Transactions on Power Electronics, vol. 7, No. 2, Apr. 1992, "Characteristics of Load Resonant Converters Operated in a High-Power Factor Mode", Michael J. Schutten, et al.

(Continued)

Primary Examiner — Adolf Berhane
Assistant Examiner — Nusrat Quddus
(74) Attorney, Agent, or Firm — Law Office of Richard F. Jaworski, PC (57) ABSTRACT An ICPT system has a single phase power supply which energises a conductive path (13) and has an inverter (5) to provide an alternating current at an operating frequency greater than the single phase utility supply frequency in the conductive path. The inverter modulates the amplitude of the alternating current with respect to the utility supply frequency such that the amplitude of the alternating current varies. The pick-up has an energy storage element (26) to provide a continuous supply of power to a load (27) irrespective of the varying amplitude of the alternating current in the conductive path.

28 Claims, 4 Drawing Sheets

(56) References Cited

U.S. PATENT DOCUMENTS

| | | | |
|---|---|---|---|
| 5,293,308 A * | 3/1994 | Boys et al. | 363/37 |
| 5,450,305 A * | 9/1995 | Boys et al. | 363/24 |
| 5,767,592 A * | 6/1998 | Boys et al. | 307/108 |
| 5,831,841 A * | 11/1998 | Nishino | 363/37 |
| 5,898,579 A * | 4/1999 | Boys et al. | 363/23 |
| 6,317,338 B1 * | 11/2001 | Boys | 363/25 |
| 6,441,590 B1 * | 8/2002 | Amantea et al. | 323/266 |
| 7,106,607 B2 * | 9/2006 | Nielsen | 363/142 |

FOREIGN PATENT DOCUMENTS

| | | |
|---|---|---|
| JP | 2000308345 | 11/2000 |
| WO | WO 2004097866 | 11/2004 |
| WO | WO 2004105207 | 12/2004 |
| WO | WO 2004105208 | 12/2004 |
| WO | 2005043775 | 5/2005 |
| WO | WO 2006118474 | 11/2006 |
| WO | WO 2006118475 | 11/2006 |

OTHER PUBLICATIONS

James et al., "A Variable Inductor Based Tuning Method for ICPT Pickups", Faculty of Engineering Papers, University of Auckland, 2005.

Kacprzak et al., "An Improved Magnetic Design for Inductively Coupled Power Transfer System Pickups", Faculty of Engineering Papers, University of Auckland, 2005.

Original and English Translation of "Notification of Reasons of Rejection" in corresponding Japanese application No. 2008-557230, Mailed Feb. 19, 2013.

English Translation of "Notification of Reasons of Rejection" in corresponding Japanese application No. 2008-557230.

* cited by examiner

SINGLE PHASE POWER SUPPLY FOR INDUCTIVELY COUPLED POWER TRANSFER SYSTEMS

FIELD OF THE INVENTION

This invention relates to Inductively Coupled Power Transfer (ICPT) systems, including power supplies for ICPT systems.

BACKGROUND

ICPT is now a widely used technique preferred for the transfer of power in situations such as clean rooms where dirt and dust must be avoided, or situations such as manufacturing plants where dirt and dust must be tolerated. Such systems take power from a utility or "mains" power supply and convert that power to a current in a conductive path which is typically an elongated loop commonly referred to as a track. Pick-up coils along the track intercept some of the magnetic field from the track. These coils are invariably tuned or compensated with a capacitor and in this way the power transferred from the track to the pick-up coil may be augmented. The power transfer may be controlled using the technique described in U.S. Pat. No. 5,293,308, the contents of which are incorporated herein by reference. The power transferred to the pick-up coil is rectified and controlled to produce a constant voltage DC output from which other devices may be operated. Alternatively a controlled output current could also be produced, but this would be a less preferred option.

In known ICPT systems the current in the track has been essentially a constant current at a VLF frequency typically in the range 5-50 kHz. Lower frequencies are not preferred as the power transfer process is more difficult, and higher frequencies are also avoided as the inductance of the track makes the establishment of a track current more difficult as the frequency increases, and the voltage required to achieve the required current increases.

To generate a constant current in the track, a conventional method is to rectify a 3-phase input from the utility supply to produce an essentially constant DC voltage and then use an inverter to produce a high frequency voltage or current signal that may then be applied to the track. In this way there are great advantages to using a 3-phase power supply as the input currents are then at an acceptable power factor and the output voltage and current are essentially constant as required. However, this technique requires two energy storage elements—a DC capacitor and a DC inductor—both of which are relatively expensive and bulky. Also as there may be significant energy stored in these elements, circuitry to control this energy particularly when switching on or off is essential. This circuitry adds cost and takes extra space. These elements store energy and operate at high voltages and currents so that micro-miniaturisation is not possible. It is also time consuming and inefficient to turn such known supplies on and off, so they tend to remain energised which adds significantly to overall operating costs.

A resonant converter that operates form a single phase supply has been proposed in "Characteristics of Load Resonant Converters Operated in a High-Power Factor Mode" by Schutten et al in IEEE Transactions on Power Electronics, Vol. 7. No. 2, April 1992. However the supply, being an LCC converter, is inherently unsuitable for use with an ICPT system. Also, improvements in power factor are obtained by control of the power supply which makes the supply more complex, and is unsuitable for multiple varying loads such as those typically present in many ICPT applications.

Object

It is an object of the present invention to provide an ICPT system, or a power supply for an ICPT system which overcomes or ameliorates one or more of the disadvantages of known systems.

Alternatively it is an object of the present invention to provide a single-phase power supply for an ICPT system.

Alternatively it is an object of the present invention to provide an ICPT system, or a method of operating such as system, or a power supply for an ICPT system, which will at least provide a useful alternative to known systems.

BRIEF SUMMARY OF THE INVENTION

Accordingly in one aspect the invention consists in an ICPT system having:
a conductive path;
a pick-up adapted to receive power from the conductive path;
a power supply to energise the conductive path, the power supply having a single phase input for receiving single phase electric power at a utility supply frequency and an inverter means to provide an alternating current at an operating frequency greater than the utility supply frequency in the conductive path and the converter means modulating the amplitude of the alternating current with respect to the utility supply frequency such that the amplitude of the alternating current varies;
wherein the pick-up has an energy storage element adapted to provide a continuous supply of power to a load supplied thereby irrespective of the varying amplitude of the alternating current in the conductive path.

In a preferred embodiment the power supply includes a transformer and a capacitive element wherein the leakage inductance of the transformer, the capacitance of the capacitive element and the inductance of the conductive path provide an LCL filter.

Preferably the leakage inductance of the transformer, the capacitance of the capacitive element and the inductance of the conductive path each have substantially the same reactance or may be tuned to have substantially the same reactance. Conveniently, the power supply has essentially no DC energy storage components.

The pick-up preferably includes a controller to control the flow of power to the energy storage element. In a preferred embodiment the controller includes a switch and the controller is operable to dispose the switch in an OFF state or an ON state to control the flow of power to the energy storage element. The controller may operate the switch at a selected frequency and control the duty ratio of the switch to control the flow of power to the energy storage element and/or to control the input power factor of the power supply.

The duty ratio may also be varied dependant on the amplitude of the voltage or current of the conductive path. In a preferred embodiment the duty ratio comprises the ratio of switch ON time to switch OFF time in each switch cycle and the duty ratio is varied such that the complement of the duty ratio is proportional to the amplitude of the voltage in the conductive path.

Preferably, in use the energy stored in the pick-up (or the energy cumulatively stored in a plurality of pick-ups) exceeds the energy stored in the power supply.

In a further aspect the invention consists in a method of supplying power to a load using an ICPT system, the method including the steps of:
energising a conductive path to provide an alternating current of varying amplitude;

using a pick-up to transfer power from the conductive path to an energy storage element associated with the pick-up, and;

using the energy storage element to provide a continuous supply of power to a load supplied thereby irrespective of the varying amplitude of the alternating current in the conductive path.

The method preferably includes controlling the flow of power from the conductive path to the energy storage element.

In a preferred embodiment the method includes controlling a switch in an OFF state or an ON state to control the flow of power to the energy storage element. The switch may be operated at a selected frequency to control the duty ratio of the switch to control the flow of power to the energy storage element and/or to control the input power factor of the power supply.

The duty ratio may also be varied dependant on the amplitude of the voltage or current of the conductive path. In a preferred embodiment the duty ratio comprises the ratio of switch ON time to switch OFF time in each switch cycle and the duty ratio is varied such that the complement of the duty ratio is proportional to the amplitude of the voltage in the conductive path.

In a further aspect the invention comprises an ICPT power supply including:

a single phase input for receiving single phase electric power at a utility supply frequency;

an output for connection to a conductive path of an ICPT system;

an inverter means to provide an alternating current at a power transfer frequency greater than the utility supply frequency, and the inverter means modulating the amplitude of the alternating current with respect to the utility supply frequency such that the amplitude of the alternating current varies;

an inductive element and a capacitive element provided between the inverter means and the output;

wherein in use the inductance of the inductive element, the capacitance of the capacitive element and the inductance of the conductive path provide an LCL filter.

Preferably the power supply includes a transformer, and the inductive element comprises the leakage inductance of the transformer. In a preferred embodiment the transformer comprises an isolating transformer.

The capacitive element is preferably provided in parallel with an output winding of the transformer.

The power supply preferably has essentially no DC energy storage components.

In a further aspect the invention consists in an ICPT system having:

an elongate conductive path;

one or more carriers, each carrier including a pick-up adapted to receive power from the conductive path; and, a single-phase power supply to energise the conductive path.

Preferably the power supply has a single phase input for receiving single phase electric power at a utility supply frequency and an inverter means to provide an alternating current at an operating frequency greater than the utility supply frequency in the conductive path and the inverter means modulating the amplitude of the alternating current with respect to the utility supply frequency such that the amplitude of the alternating current varies;

wherein the pick-up has an energy storage element adapted to provide a continuous supply of power to a load supplied thereby irrespective of the varying amplitude of the alternating current in the conductive path.

Preferably the power supply includes an inductive element and a capacitive element provided between the inverter means and the conductive path wherein in use the inductance of the inductive element, the capacitance of the capacitive element and the inductance of the conductive path provide an LCL filter.

Preferably the power supply includes a transformer, and the inductive element comprises the leakage inductance of the transformer. In a preferred embodiment the transformer comprises an isolating transformer.

In a further aspect the invention consists in an ICPT system having:

an elongate conductive path;

one or more carriers, each carrier including a pick-up adapted to receive power from the conductive path;

a power supply to energise the conductive path, the power supply having essentially no DC storage components.

Preferably the power supply has a single phase input for receiving single phase electric power at a utility supply frequency and an inverter means to provide an alternating current at an operating frequency greater than the utility supply frequency in the conductive path and the inverter means modulating the amplitude of the alternating current with respect to the utility supply frequency such that the amplitude of the alternating current varies;

wherein the pick-up has an energy storage element adapted to provide a continuous supply of power to a load supplied thereby irrespective of the varying amplitude of the alternating current in the conductive path.

Preferably the power supply includes an inductive element and a capacitive element provided between the inverter means and the conductive path wherein in use the inductance of the inductive element, the capacitance of the capacitive element and the inductance of the conductive path provide an LCL filter.

Preferably the power supply includes a transformer, and the inductive element comprises the leakage inductance of the transformer. In a preferred embodiment the transformer comprises an isolating transformer.

In a further aspect the invention broadly consists in an ICPT power supply for connection to a conductive path, the power supply including a transformer and a capacitive element wherein the leakage inductance of the transformer, the capacitance of the capacitive element and the inductance of the conductive path provide an LCL filter.

Preferably the power supply is a single-phase power supply.

Preferably the power supply has essentially no DC energy storage components.

In a further aspect the invention broadly consists in a distributed power supply for an ICPT system including a plurality of individual power supplies as set forth in any one of the preceding statements of invention, which individual power supplies each energise a section of track of the ICPT system.

Preferably the distributed power supply includes a controller to co-ordinate operation of the individual power supplies.

Preferably the individual power supplies operate off different phases of a 3-phase input mains supply.

Preferably the controller senses when a load is required or not required for a section of track and controls the individual power supply which powers the section of track accordingly.

In a further aspect the invention broadly consists in a modular ICPT track comprising a plurality of modular track sections.

Preferably the modular track sections include a power supply according to any one of the preceding statements of invention.

In a further aspect the invention consists in an ICPT system having:
a conductive path;
a pick-up adapted to receive power from the conductive path;
a power supply to energise the conductive path, the power supply having a single phase input for receiving single phase electric power at a utility supply frequency and an inverter means to provide an alternating current at an operating frequency greater than the utility supply frequency in the conductive path and the converter means modulating the amplitude of the alternating current with respect to the utility supply frequency such that the amplitude of the alternating current varies;
wherein the pick-up has an energy storage means and in use the energy stored in the pick-up is greater than the energy stored in the power supply.

The invention also consists in novel features or combinations of features described herein, and includes equivalents to such features or combinations of features.

Further aspects of the invention, which should be considered in all its novel aspects, will become apparent to those skilled in the art upon reading the following description.

BRIEF DESCRIPTION OF THE DRAWINGS

One or more embodiments of the invention will now be described by way of example with reference to the accompanying drawings, in which.

DESCRIPTION OF A PREFERRED EMBODIMENT

The present invention provides a power supply where a single phase input may be used yet a high input power factor is still achieved. The supply has essentially no DC energy storage elements and it produces an alternating sinusoidal current in the track that is not constant at all but varies in magnitude. The track current is severely amplitude modulated with respect to the utility supply frequency. Therefore, in a preferred embodiment, the magnitude of the track current varies from zero to a maximum value at a rate of two times the utility supply frequency—typically 100 or 120 Hz. This is different from other ICPT systems where essentially constant current is always required. Pick-up coils which are provided on pick-ups operating in this ICPT system also have a widely fluctuating signal level. However, this problem is overcome by the design and control of the pick-up. The output voltage from a pick-up coil controller is made essentially constant by using one or more appropriate energy storage elements, such as a large capacitor on the output of the pick-up controller, and may be used to drive a multiplicity of output loads comparable to an ICPT system operating with a constant track current.

Figures 1, 1A:
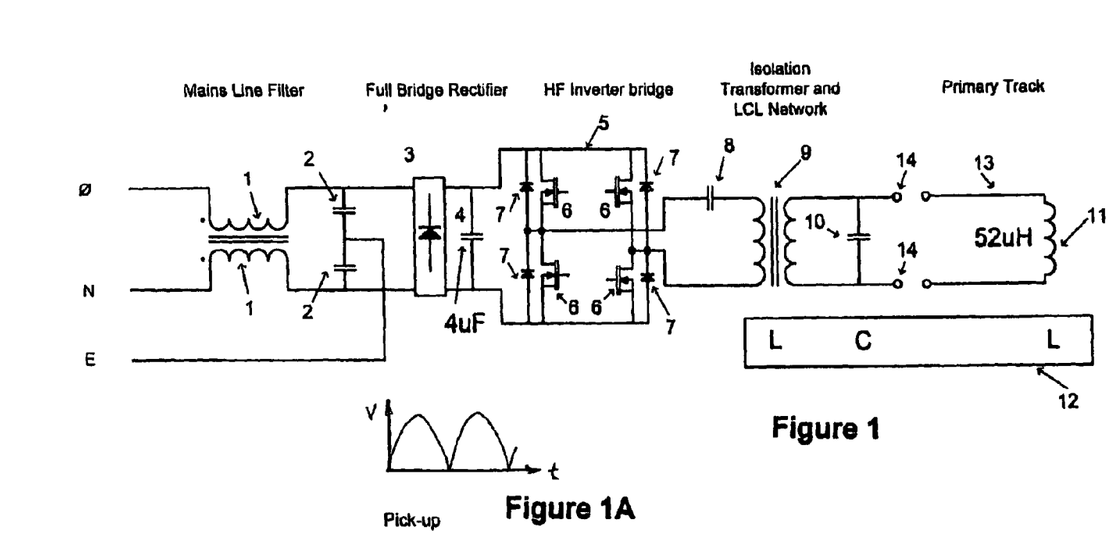
FIG. 1 is a circuit diagram for a single-phase ICPT power supply.
FIG. 1A is an illustrative plot of voltage (V) against time (t) at the output of the rectification stage of the power supply of FIG. 1.

An example of a power supply according to the invention is shown diagrammatically in FIG. 1. The supply has a single phase input ($\phi$, N) which is provided to an input transformer 1, is split by capacitors 2 and provided to a full wave rectifier bridge 3 as shown in FIG. 1. The output of the rectifier bridge 3 goes to a capacitor 4 which is very small (approximately 3 µF per kW rating of the power supply) and has little filtering effect at mains frequencies. This can be seen from FIG. 1A which shows the output voltage waveform of the full wave rectifier 3. The capacitor 4 is so small that typical power supplies may be switched on and off with no regard to inrush currents, as the natural inductance in the mains supply will provide sufficient current limiting.

In the power supply shown in FIG. 1, the unfiltered DC from the output of rectifier 3 is used as the input to an inverter 5 operating at a frequency significantly higher than the mains supply frequency. This operating frequency is typically in the range 10-40 kHz. The inverter includes appropriate switching devices 6 and anti-parallel diodes 7 (which may comprise part of each switching device). The output of inverter 5 passes through a small capacitor 8 and a transformer such as isolating transformer 9 before being used to drive the conductive path, being track 13. A capacitor 10 is connected in parallel with the secondary winding of transformer 9. The capacitance of capacitor 10 and the leakage inductance of transformer 9 are selected so that an LCL filter is provided by transformer 9, capacitor 10, and the inductance of the track 13. In a preferred embodiment, the reactance values of the three reactive components are tuned or otherwise selected to be substantially the same. This arrangement allows an appropriate current to be provided in the track. It is particularly low cost as there is no large filter capacitor and no smoothing DC inductor as would be usual in a supply of this type. As noted the lack of these components also dramatically reduces the size and weight of the supply.

A non-constant current power supply causes problems when used with an ICPT system, particularly a system with a number of moving carriers. Here when the ICPT system with the power supply of FIG. 1 is in operation the lack of energy storage elements in the supply means that the "DC" voltage across the capacitor 4 varies widely from a peak voltage that corresponds to the peak mains voltage to a minimum voltage that is load dependent but at even relatively modest loads is substantially zero. This widely varying voltage causes an equivalent variation in the track current. We have found that this supply has a high input power factor. The conduction angle for the input diodes of the diode bridge comprising rectifier 3 is large, and as the mains voltage rises and falls the current also rises and falls to provide the high power factor.

To drive loads where constant power is required (for example moving carriers where a discontinuous supply is not feasible), energy storage is required. Unlike known systems such storage is not provided by the power supply but is now provided in the pick-up circuits.

FIG. 14 of U.S. Pat. No. 5,293,308 (referred to above) clearly shows an energy storage capacitor in the pick-up controller. However, this pick-up circuit topology and capacitor were selected dependent on a current of constant amplitude in the track. We have found that the same pick-up controller topology can be used with the present system, but with a capacitor that is sized to provide energy storage as required for the loads driven by a pick-up circuit which has a widely fluctuating input signal level. Indeed, if the pick-up controller operates at a relatively slow frequency then the capacitor size can be increased. If the pick-ups operate at a faster switching rate a suitable capacitor will improve their performance so the burden of this 'demand-side' energy storage is not excessive.

Figure 2:
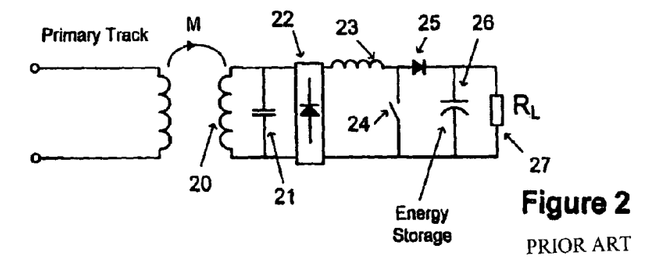
FIG. 2 is a circuit diagram of an ICPT system pick-up.

Referring to FIG. 2, a pick-up such as that disclosed in U.S. Pat. No. 5,293,308 is shown. The pick-up includes a pick-up coil 20 and tuning capacitor 21. The output of the tuned circuit is provided to rectifier 22 and from there to inductor 23. A controlled switch 24 provides control of power transfer from the conductive path to selectively allow current to flow through diode 25 to capacitor 26 and load 27. As described above, the capacitor 26 may be used as an energy storage element to provide a substantially continuous supply of power to the load during those intervals when the load requires more power than that which can be drawn from the track due to the variation in the track current.

Therefore, the energy storage element of each pick-up is adapted to provide a continuous supply of power to the load supplied thereby irrespective of the varying amplitude of the alternating current in the conductive path. Therefore, should the power required by the load at a certain interval be unable to be supplied from the conductive path due to variation in the alternating current in the conductive path, then capacitor 26 supplies the load until such time as more power is available from the conductive path. In preferred embodiments the energy storage element or elements associated with the pick-ups are adapted by having a selected energy storage capacity or by control of energy storage capacity.

In operation, the ICPT system described above therefore has more energy stored in the pick-up than in the power supply. Similarly, if there are multiple pick-ups, then there is more energy cumulatively stored in the pick-ups than in the supply.

When the power supply is used in this way with the controller of FIG. 2 acting to control the power flow from the supply to the pick-up load, the power factor on the AC input side ($\phi$ and N in FIG. 1) is good but can be improved still further. The controller works by operating switch 24 between an ON state and an OFF state. This is performed such that when more power is required switch 24 is ON for a shorter fraction of the time. The power flowing from the pick-up coil 20 to the energy storage capacitor 26 is directly proportional to the current through diode 25 multiplied by the constant voltage on capacitor 26. Therefore, the switch 24 can be switched at a constant frequency and the power flowing from the pick-up coil 20 (and thus from the track) to the storage capacitor 26 can be directly controlled by the duty ratio of switch 24.

If the duty ratio (i.e. the ratio of switch ON time to switch OFF time in a switching cycle) is constant, then the power varies in a rectified sinusoidal fashion as the input mains voltage to FIG. 1 varies. As the duty ratio D of the switch is increased, the switch 24 is ON for a larger fraction of the time; since the switch 24 is in parallel with the pick-up resonant circuit the current through 25 to 26 is reduced, so the power transfer is reduced.

However the control of switch 24 may be augmented by operating the switch at a relatively high switching frequency and having the average switching duty cycle provide an average current flow to 26 to meet the demands of the load 27, but having the actual duty cycle vary through the mains voltage cycle such that when the mains voltage is low the duty cycle is high and vice versa. We have found that this improves the power factor of the power supply since the current transferred to the energy storage capacitor directly corresponds to the voltage in the track in each modulation cycle. In practice this is simple to do as the nominally DC current in inductor 23 is directly proportional to the rectified mains voltage and varies through the mains cycle. Therefore a sensor may be provided to sense current flow through inductor 23 and the sensed current signal can be used as a control reference for control of the duty ratio.

Thus varying the switch duty ratio D such that the complement of the duty ratio (1-D) is proportional to the current through inductor 23 throughout each half cycle, but the average value over many mains cycles for (1-D) is appropriate to hold the DC output voltage constant, achieves both goals and provides regulation while improving the input power factor. In practice power factors in the range 0.96 to 0.995 are quite easy to achieve.

Measurements with a Practical Power Supply.

A single-phase power supply with no substantial DC energy storage elements has been developed, according to the supply shown in FIG. 1. The supply has been tested with a single phase 230V AC 50 Hz mains input, and a 1.4 kW output into an essentially pure resistance of 4 Ohms. Waveforms for both the input mains current (lower trace) and the track current (upper trace) running at 400 W output are shown in FIG. 3, and the inverter bridge output voltage (lower trace) and track current (upper trace) detail (on a mains voltage peak) are shown in FIG. 4.

Figure 3:
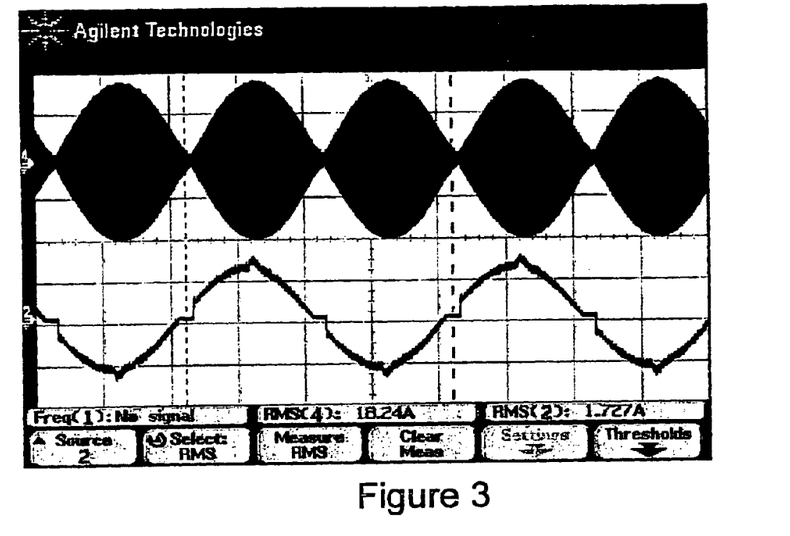
FIG. 3 shows waveforms for track current (upper trace) and mains input current (lower trace) for an ICPT power supply according to FIG. 1 at 400 W.
Figure 4:
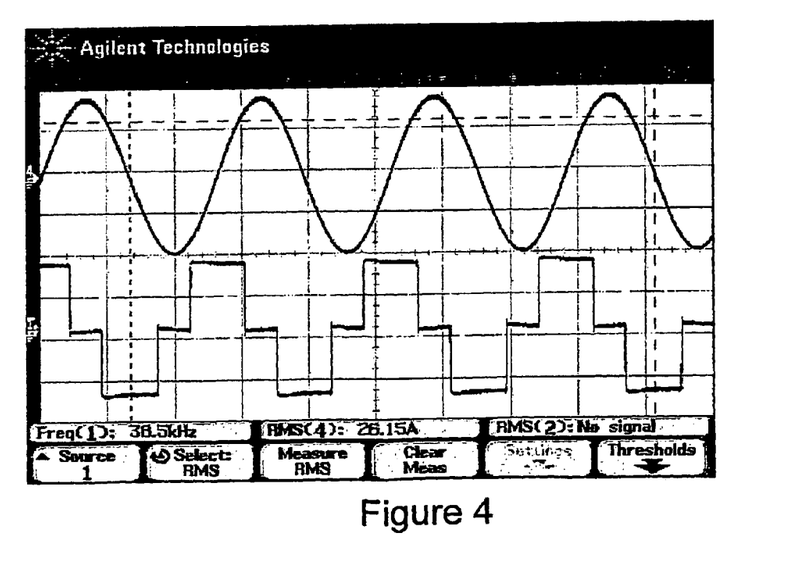
FIG. 4 shows waveforms for track current (upper trace) and inverter bridge output voltage (lower trace) for a mains voltage peak for a prototype ICPT power supply according to FIG. 1 at 400 W.
Figure 5:
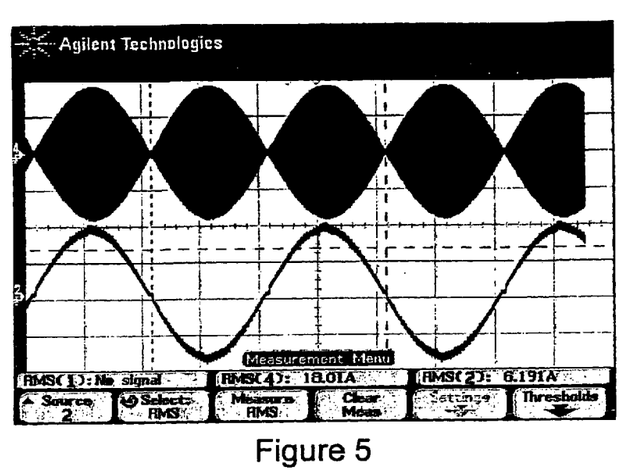
FIG. 5 shows waveforms for track current (upper trace) and mains input current (lower trace) for an ICPT power supply according to FIG. 1 at 1.4 kW.

At full power of 1.4 kW the equivalent current waveforms to those of FIG. 3 are shown in FIG. 5. At full power the measured input power factor is 0.998 and the efficiency is 93% for an input voltage of 240 V, rising to 96% for an input voltage of 210 Volts. At the reduced power of 400 W the power factor is 0.97 and the efficiency is 91%. The track current and inverter voltage waveforms at 1.4 kW are indistinguishable from the waveforms at 400 W shown in FIG. 4.

As discussed above, switch 24 of the pick-up may be conveniently operated at a high switching frequency (for example 25 kHz) with a duty ratio that varies according to the DC voltage on capacitor 26. If the voltage is low (less than 285 Volts) the switch is permanently OFF to transfer maximum power and here D=0. If the voltage is too high (greater than 315 Volts) then the switch is permanently ON to decouple the pick-up and transfer zero power, and D=1. Between these extremes D is given by D $$D = \frac{(V - 285)}{30}$$

so that there is a gradual variation between no power and full power. To shape the current and improve the power factor the calculated value for D is now modified by including the variation of the current in inductor 23, $\sin(\theta)$, in each half cycle:

$$(1-D)_{Shaped} = (1-D)|\sin(\theta)|$$

Values of D less than zero or greater than 1 are set to those limiting values. This causes a slight reduction in power but significantly improves the power factor. The improvement in power factor may be seen in FIGS. 6A, 6B and 7A, 7B.

Figure 6A:
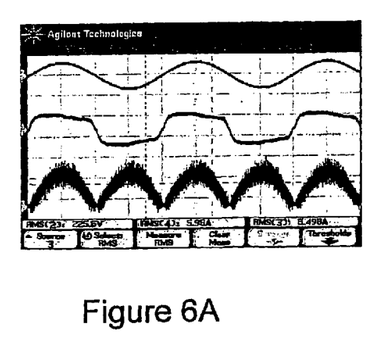
FIG. 6A shows waveforms for the input mains voltage (upper trace), the input mains current (middle trace) and the pick-up DC inductor (23) current (lower trace) without switching to improve power factor.
Figure 6B:
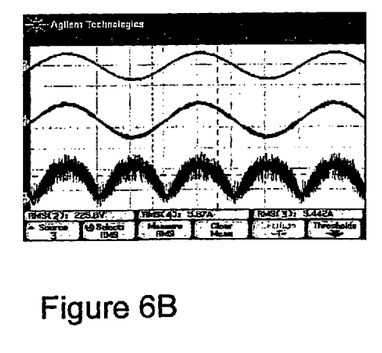
FIG. 6B shows the same waveforms as those of FIG. 6A with switching (switch 24) to improve power factor.
Figure 7A:
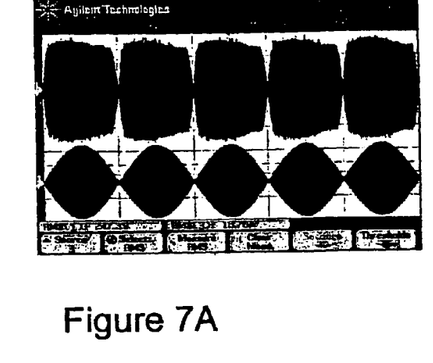
FIG. 7A shows waveforms for resonant tank voltage (upper trace) and conductive path (i.e. track) current (lower trace) without switching to improve power factor.
Figure 7B:
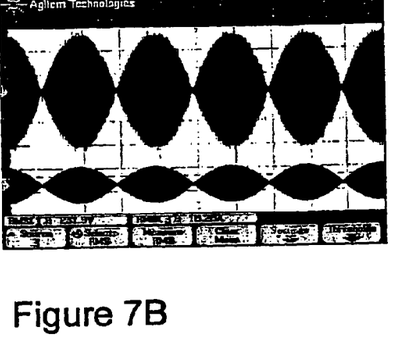
FIG. 7B shows the same waveforms as those of FIG. 7A with switching (switch 24) to improve power factor.

The improvement in the form factor of the middle trace in FIGS. 6A and 6B improves the input power factor from 0.85 to 0.99. This improvement is also shown in the top trace of FIGS. 7A and 7B where the voltage across the resonating capacitor 21 of FIG. 2 is much more sinusoidal. These Figures are taken under nominally the same conditions with a power transfer of 1.3 kW from the input mains supply to a pick-up with a DC voltage of 300 V DC. This is a surprising result as the wave shaping in the pick-up is affecting the power factor in the supply which is spatially and electrically isolated from it.

The power supply disclosed herein has advantages of lower cost, size and weight over known power supplies, and the ICPT system disclosed herein has the advantage of being able to provide a load with a continuous supply of power from a conductive path in which the magnitude of the alternating current varies significantly and may vary to the point of being discontinuous i.e. reaching zero or substantially zero.

The present power supply also has application for driving fluorescent lights. In this application an elongated loop of appropriate conductive material, such as Litz wire, comprises the conductive path and is driven by the power supply with a current. Pick-up coils with no controller but simply a tuning capacitor (connected in parallel with each pick-up coil) are placed about the loop so that the pick-up coils can intercept magnetic flux from the track. In one embodiment, these pick-up coils are conveniently a slotted toroid with a coil wound on it. The slot is constructed such that it can receive the loop conductor so that there is good magnetic coupling (but no electrical contact) between the toroid and the loop conductor. A fluorescent tube or bulb is connected across the tuning capacitor in parallel and is driven from the pick-up resonant circuit comprising the pick-up coil and the tuning capacitor. The ripple current provides a high strike voltage at a 100 Hz rate. The power supply presents a good power factor to the mains and allows for dimming all the connected lights at the same time by reducing the loop current. Turn-n ratios of the order of 10:1 are easy to obtain. The supply can also be used to drive other types of lighting and to have individual control over lights using the system disclosed in International Patent publication WO 2005/043775.

The invention also allows a distributed power supply to be implemented in an ICPT system, and such a distributed supply may comprise a number of modular power supply units and also modular track sections.

Conventionally single phase circuits do not have the power handling capability of 3-phase ones. Thus new power supplies constructed on the principles herein are invariably rated at lower powers but the cost/kW is still lower with the new supply disclosed above than with a conventional power supply.

Figure 8:
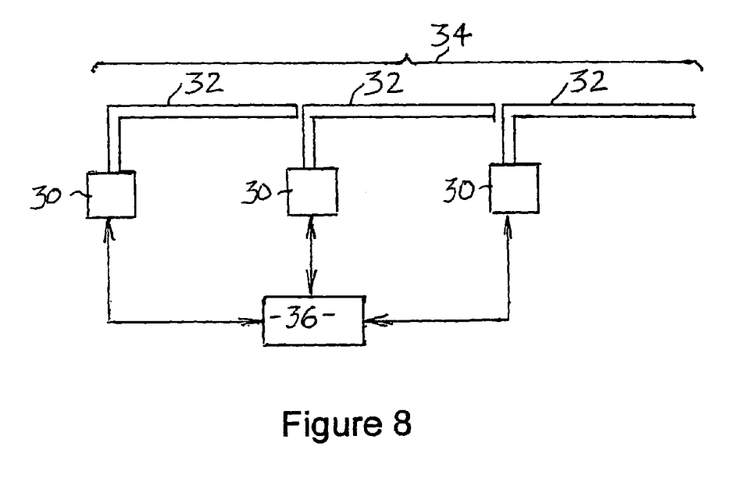
FIG. 8 is a diagram of a distributed power supply according to the present invention.

Thus new single phase power supplies may advantageously be distributed about an ICPT system giving a distributed power supply instead of a single central power supply to provide the same power to the complete ICPT system but still at lower overall cost. With moving carriers each part of the distributed power supply only drives a short section of track and can be turned off when there are no carriers to drive to reduce the standing losses—this is not possible with a conventional power supply, but is possible now as the new single phase supply can be turned on and off quickly and efficiently. Individual power supplies in the distributed supply can be driven from different phases of a 3-phase input to balance the load taken by the whole plant. As carriers move the load shifts from one phase to the next but it is a small load and with the diversity of a large number of carriers on a long track the load on the system is approximately balanced across the 3 input phases to the plant. Referring to FIG. 8, a number of single phase supplies 30 are shown, each supplying a section 32 of track which sections together provide a length of system track 34. Each supply 32 (or a separate sensing arrangement) includes a sensing means (not shown) to sense the presence of a load on its section of track. A controller 36 is in communication with each supply 32 and optionally receives information as to movement of carriers in the system. Therefore, the controller is operable to de-energise a supply if a carrier on the relevant section of track does not need a supply, or is not present on that section of track. Similarly, when a load is demanded, for example when the controller is instructed that a carrier will need to move, or when a carrier is about to move onto a particular track section, then the track section can be energised.

For non-technical or unskilled people to install an ICPT system, the complicated structure of ICPT may often cause the installation carried out to be technically incorrect. Under most circumstances, it is the value of the track inductance that is incorrectly chosen. The distributed power supply referred to above (or alternatively the track sections) may be provided as modular units wherein parameters such as track inductance are known, so that the distributed supply is easily and quickly installed.

Aspects of the present invention have been described by way of example only, and it should be apparent to those skilled in the art to which the invention relates that modifications or additions may be made without departing from the scope of the invention.

The invention clamed is:

1. An inductively coupled power transfer (ICPT) system comprising:
   a conductive path;
   a pick-up adapted to receive power from the conductive path;
   a power supply to energize the conductive path, the power supply comprising a single phase input for receiving single phase electric power at a utility supply frequency and a converter to provide an alternating current at an operating frequency greater than the utility supply frequency in the conductive path and the converter modulating the amplitude of the alternating current with respect to the utility supply frequency such that the amplitude of the alternating current varies;
   wherein the pick-up comprises an energy storage element adapted to provide a continuous supply of power to a load supplied thereby irrespective of the varying amplitude of the alternating current in the conductive path; and
   wherein the power supply modulates the alternating current to vary in amplitude between substantially zero and a maximum value.

2. An ICPT system as claimed in claim 1 wherein the power supply comprises a transformer and a capacitive element wherein the leakage inductance of the transformer, the capacitance of the capacitive element and the inductance of the conductive path provide an LCL filter.

3. An ICPT system as claimed in claim 2 wherein the leakage inductance of the transformer, the capacitance of the capacitive element and the inductance of the conductive path each have substantially the same reactance or are tuned to have substantially the same reactance.

4. An ICPT system as claimed in claim 1 wherein the power supply has essentially no DC energy storage components.

5. An ICPT system as claimed in claim 1 wherein the pick-up comprises a controller to control the flow of power to the energy storage element.

6. An ICPT system as claimed in claim 5 wherein the controller comprises a switch and the controller is operable to dispose the switch in an OFF state or an ON state to control the flow of power to the energy storage element.

7. An ICPT system as claimed in claim 6 wherein the controller operates the switch at a selected frequency and controls the duty ratio of the switch to control the flow of power to the energy storage element.

8. An ICPT system as claimed in claim 7 wherein the duty ratio is varied dependant on the amplitude of the voltage or current of the conductive path.

9. An ICPT system as claimed in claim 7 wherein the duty ratio of the switch is controlled to improve the input power factor of the power supply.

10. An ICPT system as claimed in claim 7 wherein the duty ratio comprises the ratio of switch ON time to switch OFF time in each switch cycle and the duty ratio is varied such that the complement of the duty ratio is proportional to the amplitude of the voltage in the conductive path.

11. An ICPT system as claimed in claim 1 wherein in use the energy stored in the pick-up exceeds the energy stored in the power supply.

12. An ICPT system as claimed in claim 1 wherein the plurality of pick-ups are provided and in use the energy cumulatively stored in the pick-ups exceeds the energy stored in the power supply.

13. A method of supplying power to a load using an inductively coupled power transfer (ICPT) system, the method comprising:
   energizing a conductive path to provide an alternating current of varying amplitude;
   using a pick-up to transfer power from the conductive path to an energy storage element associated with the pick-up;
   using the energy storage element to provide a continuous supply of power to a load supplied thereby irrespective of the varying amplitude of the alternating current in the conductive path; and
   modulating the alternating current to vary in amplitude between substantially zero and a maximum value.

14. A method as claim in claim 13 comprising controlling the flow of power from the conductive path to the energy storage element.

15. A method as claimed in claim 14 comprising controlling a switch between an OFF state or an ON state to control the flow of power to the energy storage element.

16. A method as claimed in claim 15 comprising operating the switch at a selected frequency and controlling the duty ratio of the switch to control the flow of power to the energy storage element.

17. A method as claimed in claim 16 comprising varying the duty ratio dependant on the amplitude of the voltage or current of the conductive path.

18. A method as claimed in claim 16 comprising controlling the duty ratio of the switch to improve the input power factor of the power supply.

19. A method as claimed in claim 16 wherein the duty ratio comprises the ratio of the switch ON time to switch OFF time in each switch cycle and the method comprises controlling the duty ratio such that the complement of the duty ratio is proportional to the amplitude of the voltage in the conductive path.

20. An inductively coupled power transfer (ICPT) power supply comprising:
   a single phase input for receiving single phase electric power at a utility supply frequency;
   an output for connection to a conductive path of an ICPT system:
   a converter to provide an alternating current at a power transfer frequency greater than the utility supply frequency, and the converter modulating the amplitude of the alternating current with respect to the utility supply frequency such that the amplitude of the alternating current varies in amplitude between substantially zero and a maximum value;
   an inductive element and a capacitive element provided between the converter and the output;
   wherein in use the inductance of the inductive element, the capacitance of the capacitive element and the inductance of the conductive path provide an LCL filter.

21. An ICPT power supply as claimed in claim 20 comprising a transformer, and the inductive element comprises the leakage inductance of the transformer.

22. An ICPT power supply as claimed in claim 21 wherein the leakage inductance of the transformer, the capacitance of the capacitive element and the inductance of the conductive path each have substantially the same reactance or are tuned to have substantially the same reactance.

23. An ICPT power supply as claimed in claim 21 wherein the transformer comprises an isolating transformer.

24. An ICPT power supply as claimed in claim 21 wherein the capacitor element is provided in parallel with an output winding of the transformer.

25. An ICPT power supply as claimed in claim 20 wherein the power supply has essentially no DC energy storage components.

26. An ICPT system as claimed in claim 8 wherein the duty ratio of the switch is controlled to improve the input power factor of the power supply.

27. An inductively coupled power transfer (ICPT) power supply comprising:
   a single phase input for receiving single phase electric power at a utility supply frequency;
   a rectifier to rectify the single phase electric power;
   a converter coupled by a capacitor to the rectifier and arranged to provide an alternating current at an operating frequency greater than the utility supply frequency, wherein the capacitor is sufficiently small such that the alternating current is severely amplitude modulated with respect to the utility supply frequency.

28. An ICPT system as claimed in claim 27, wherein the capacitor is approximately 3 uF per kW rating.

* * * * *